No. 871,403. PATENTED NOV. 19, 1907.
J. R. HARRISON.
VEHICLE WEIGHER.
APPLICATION FILED NOV. 23, 1906.
3 SHEETS—SHEET 1.
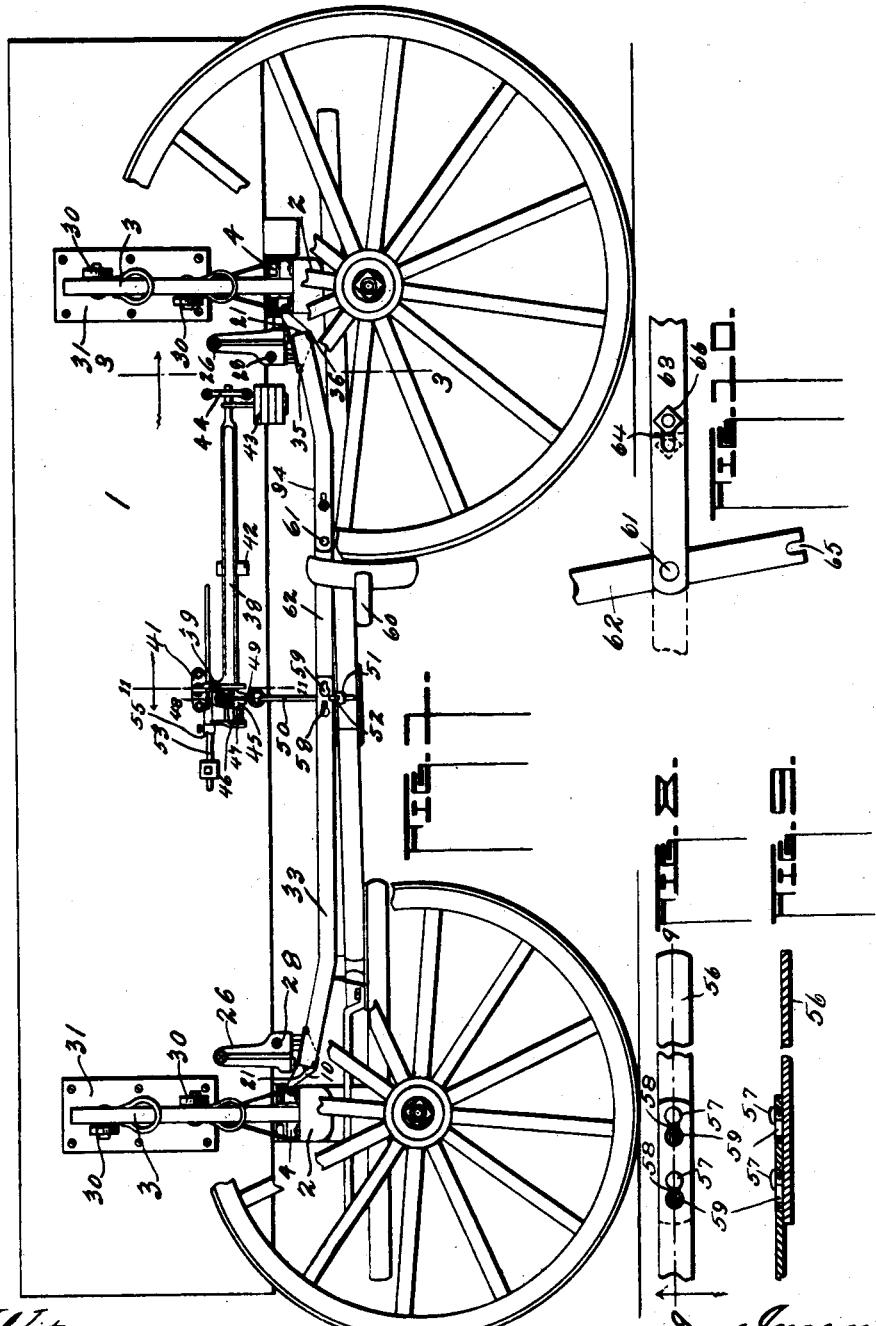
Witnesses:—
E. W. Giles
Mary E. Conegys
Inventor.
James R. Harrison
By W. V. Tefft
Atty.

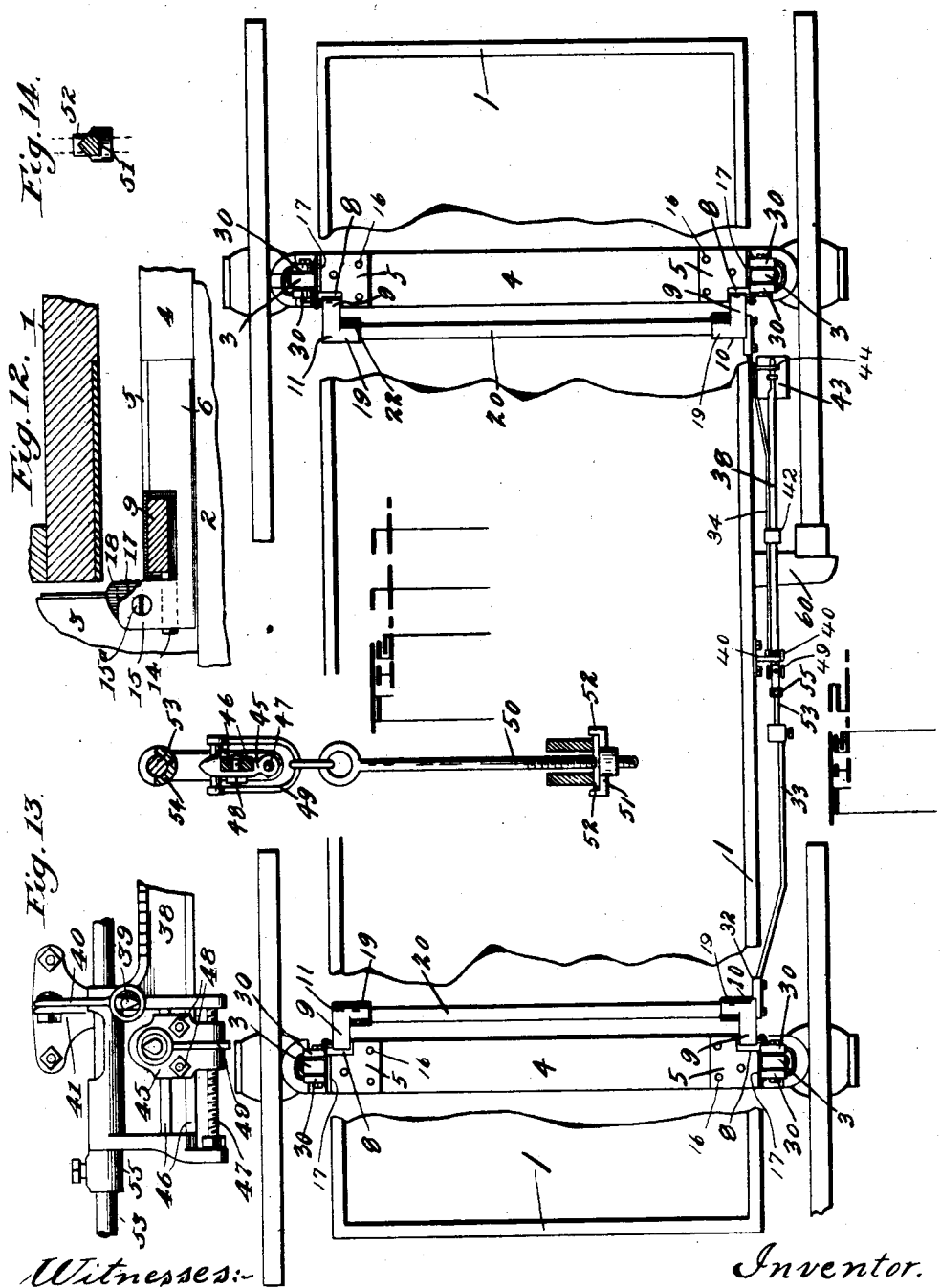

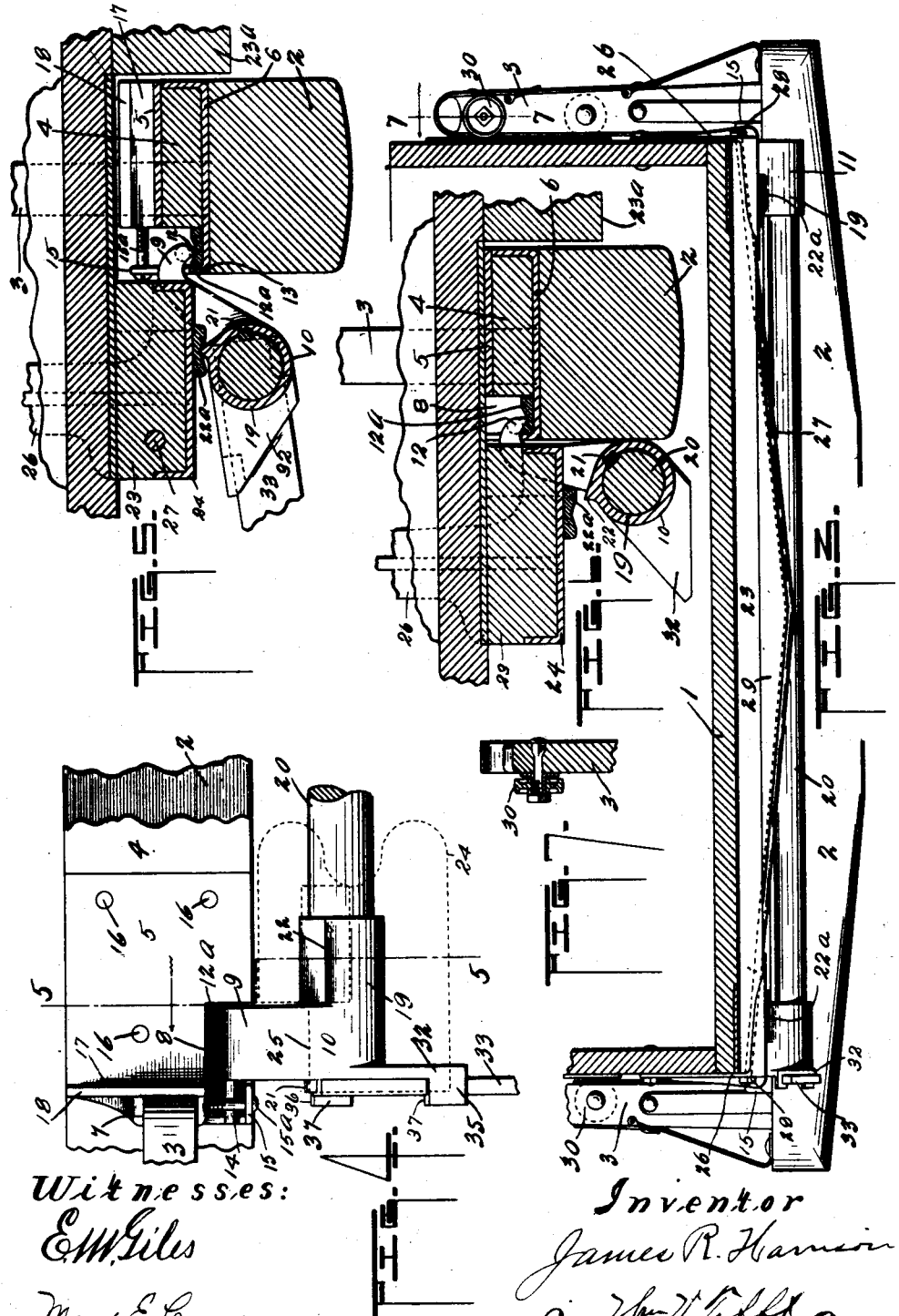

UNITED STATES PATENT OFFICE.

JAMES R. HARRISON, OF PEORIA, ILLINOIS.

VEHICLE-WEIGHER.

No. 871,403.

Specification of Letters Patent.

Patented Nov. 19, 1907.

Application filed November 23, 1906. Serial No. 344,739.

*To all whom it may concern:*

Be it known that I, JAMES R. HARRISON, a citizen of the United States, residing at Peoria, in the county of Peoria and State of Illinois, have invented certain new and useful Improvements in Vehicle-Weighers; and I do hereby declare that the following is a full, clear, and exact description of the invention, which will enable others skilled in the art to which it appertains to make and use the same.

This invention has reference to weighing devices which are mounted on vehicles and adapted to weigh the load carried by the vehicle.

The object of my invention is to provide simple and efficient means, which can be easily and readily applied to any ordinary vehicle, for weighing the load which it carries, and in furtherance of this object this invention presents many features of improvement over the vehicle weigher for which I filed application for Letters Patent Dec. 30, 1905, Serial No. 294,014.

Referring to the accompanying drawings, which are made a part hereof, and in which similar characters of reference indicate similar parts in the several views, Figure 1 is a side view of a wagon with my weighing device applied thereto, showing the parts in their positions of operation, portions of the wagon wheels being broken away to give an unobstructed view of the parts of the weighing device; Fig. 2, a top view of the wagon of Fig. 1, portions of the wagon bed being broken away to show parts of the weighing device on the bolsters; Fig. 3, a vertical cross sectional view, somewhat enlarged, on the line 3—3 of Fig. 1, looking in the direction indicated by the arrow; Fig. 4, an enlarged top view of one of the lifting members of the weighing device, in its position of operation, showing adjacent parts on the bolster; Fig. 5, a sectional view on the line 5—5 of Fig. 4, looking in the direction indicated by the arrow; Fig. 6, a view similar to Fig. 5, showing the parts thereof in the positions they assume when not in operation; Fig. 7 a vertical sectional view on the line 7—7 of Fig. 3; Fig. 8 shows the extension for lengthening the lifting levers, and the manner of connecting the same thereto; Fig. 9 is a longitudinal sectional view on the line 9—9 of Fig. 8, looking in the direction indicated by the arrow; Fig. 10 an enlarged view of the joint of the rear lever of Fig. 1; Fig. 11 is a vertical sectional view, somewhat enlarged, of the scale mechanism, on the line 11—11 of Fig. 1, looking in the direction indicated by the arrow. Fig. 12 is a fragmentary view looking at the inner side of the bolster showing the parts of the weighing device thereon, shown in Figs. 4 and 5; Fig. 13 an enlarged side view of that end of the scale beam to which the weight of the load is applied showing the manner of supporting same on the side of the wagon bed; and Fig. 14 is a sectional view of the transverse piece 51 to which the ends of the lifting levers are attached, the said view being taken just inside the upturned portion 52 looking inwardly.

In the drawings, which show the application of my invention to an ordinary wagon, 1 is the wagon bed, which is supported on the bolsters 2 and held thereon against lateral displacement by the standards 3 which are provided at each end of the bolsters. The bolsters are connected and mounted on the running gear of the wagon in the usual manner, and on the top of each bolster, intermediate of the standards is a strip or superstructure 4, upon which the wagon bed is supported in its normal position, said strip being designed to hold the wagon bed above the top of the bolster for purposes hereinafter mentioned. This strip or super-structure is arranged to be removable from its position on the bolster, and each end is incased in the upper and lower plates 5 and 6 respectively, both of which are provided with the matching notches or cut away places 7 adapted to straddle the standards 3 and hold the strip or super-structure in place on the bolster.

At the inner side of the bolsters and at each end of the strip or superstructure 4, the upper plate 5 and the strip 4 are cut away, as at 8, above the lower plate 6 to receive the hooked extremity 9 of the lifting members 10 and 11, which said hooked parts are formed by the downwardly projecting knife edge bearing 12 on each lifting member, which said knife edge bearing is adapted to bear on the grooved bearing 12ª which sits in the cut away place in the strip 4 on the plate 6, and the strip or superstructure 4 is provided and is of suitable thickness to hold the wagon bed sufficiently above the bolster to permit free operation of the lifting members on the bolsters. The lifting members 110

10 and 11, when not in operation, drop down against the side of the bolster as shown in Fig. 6, and when in such position the knife edge of the lifting member does not bear directly on the bearing member and is prevented from the wear to which it would be subjected if it at all times rested directly on the said edge. The raised edge 13 on the lower plate 6 holds the bearing member 12ª in place and said bearing member may be riveted or otherwise secured to the plate 6. There is a stud 14 projecting laterally from each lifting member adjacent the knife edge, which said stud is embraced by the guard 15, which is preferably integral with the lower or bearing plate 6, extends upwardly and has the screw 15ª passing therethrough and screwed into the upper casting 5 as shown, to effectively prevent accidental displacement of the lifting member from its position on the bearing plate 6. The sides of the said bearing plate, except where cut away to allow admission of the hooked end of the lifting member, extend upwardly to the top plate 5 which rests thereon, and said plates 5 and 6 are preferably riveted together through the strip 4, as at 16, or otherwise rigidly fastened together and to the strip 4. The upper plate 5 is provided at its outer edge adjacent the standard with an upwardly extending portion 17 which lies against the standard and has the inner face inclined downwardly as at 18, so as to wedge the wagon bed away from the standard when at rest on the strip 4.

As above suggested, there is a pair of lifting members on each bolster, on the inner side thereof, one adjacent each standard, which have their knife edge extremities 12 adapted to bear on the bearing members 12ª on the bearing plate 6, and the said lifting members are provided with the hub portions 19 which extend laterally from the body part thereof and are arranged some distance away from the knife edge terminals of the said lifting members. These hub portions 19 on each pair of lifting members extend inwardly toward one another and are bored to receive a large shaft 20 which extends parallel with the bolster upon which the lifting members are mounted, and upon the ends of said shaft the lifting members are secured and keyed, as at 21, or otherwise secured so as to be held exactly in line on the shaft and be correspondingly and simultaneously movable.

The laterally projecting hub portions 19, above mentioned, are each furnished on the upper part with a knife edge bearing 22 so arranged, as is also the knife edge 12 that when the lifting members are moved on their bearing edges 12 so that the vertex of bearing edge 12 and the vertex of bearing edge 22 lie in a horizontal plane, the said knife edge bearings will be perpendicular to said plane,—that is, the plane bisecting said knife edge bearings will be perpendicular to said horizontal plane.

The knife edge bearings 22 are adapted in the inoperative position of the lifting members, shown in Fig. 6, to be disengaged to prevent wear thereof, but are arranged so that when swung on their knife edge terminals to come into contact with bearing members 22ª on the wagon bed, and in the further movement thereof to raise the wagon bed off the strips 4, so that when the vertices of the bearings 12 and 22 are brought into the same horizontal plane, the wagon bed is raised entirely free from the superstructure 4, and the wedge members 17 thereof.

As is apparent, the bearing edges 22 will contact with the bearing members on the bottom of the wagon bed at the sides thereof, and there is a transverse strip 23 on the bottom of the wagon bed just inside each bolster, which in the normal lowered position of the wagon bed lies alongside the bolster and serves to prevent longitudinal displacement of the wagon bed, and in the elevated position of the wagon bed moves clear of the bolster. These strips extend from side to side of the wagon bed, and are provided at each end above the lifting members 10 and 11 with the plate 24, (shown in dotted lines in Fig. 4) which has the bearing members 22ª integral therewith or separate and secured thereto which the knife edges 22 of the lifting members engage in raising the wagon bed, and said plates together with the strips 23 are cut away or notched as shown by dotted lines at 25, Fig. 4, to provide room for the operation of the hooked end of the lifting members.

The bearing members 22ª are grooved as shown in the drawings, and the sides of the groove incline to the groove so that as the knife edge 22 of the lifting member is raised it will be forced into the groove and the grooved member 12ª which the terminal knife edge of the lifting member engages is furnished so that when the wagon bed is raised it will be held so that the transverse strip 23 and the transverse strip 23ª are prevented from rubbing against the bolster or strip 4 thereon. The plates 24 are further provided with upwardly extending portions 26 which lie against the sides of the wagon bed and are fastened thereto for securing the plates and strips 23 more firmly to the wagon bed, and to hold the sides of the wagon bed adjacent the standards from spreading. For further holding the sides of the wagon bed from spreading and for supporting the wagon bed, when suspended, from settling or sagging intermediate of the bearing plates 24, there is provided a truss rod 27 which is bowed beneath the transverse strip 23 and has the ends thereof extending angularly through the ends of the strips above the bearing plates and protruding through openings in the upwardly extending portions 26 of the plates 24. Both of the protruding ends of this truss rod are threaded and provided with nuts 28 which are screwed thereon against the upwardly extending part 26 of the bearing plates 24 for drawing and holding the said truss rod 27 taut. Between the central bowed portion of the truss rod 27 and the strip 23 is a filler or brace 29, the upper face of which lies against the strip 23, and the lower edge of which conforms to the bowed shape of the truss rod as shown in Fig. 3, to properly distribute the support of the truss rod evenly throughout the width of the wagon bed.

To reduce the friction of the wagon bed against the standards 3, in the operation of raising and weighing the load each standard is provided with a pair of anti-friction rollers 30. These rollers are carried on bolts which pass through the standards, and are arranged on opposite sides thereof, one near the top of the standard and the other near the bottom, and extend beyond the plane of the inner face of the standard so as to bear against the plates 31 on the side of the wagon bed when the sides of the wagon bed are forced toward the standards.

The scale mechanism for indicating the weight of the load is mounted on one side of the wagon, and the lifting members 10 on that side of the wagon are provided with longitudinally extended parts 32 to which the lifting levers 33 and 34 are adapted to be attached for operating the lifting members for raising and holding the wagon bed in suspension. The lifting members 11 on the opposite side of the wagon from the scale mechanism are operated through the shafts 20 from the lifting members 10 and consequently are not provided with the extensions for attaching the lifting levers.

The levers 33 and 34 are removably connected with the extensions 32 of the lifting members 10, so that they may be readily and quickly placed in position when the weighing device is to be used, and quickly removed when through using, and for this purpose the extended part 32 is provided with the laterally extending lugs 35 and 36 diagonally arranged on the outer face thereof as shown so as to grip the lever when inserted therebetween and moved upward, and said lugs have lips 37 which overlie the lever when in position and hold it against the extended part 32. The keys 21 extend out beyond the face of the extended portion 32 a short distance, or other means may be provided, to limit the insertion of the levers 33 and 34 between the lugs 35 and 36.

The levers 33 and 34 when in the initial position extend substantially downward, and in moving the lifting members 10 and 11 to raise the wagon bed describe a considerable arc, so as to bring the vertices of the bearings 12 and 22 into the same horizontal plane, and the levers 33 and 34 are so connected with the lifting members 10 that when the bearings 12 and 22 are in the position above indicated, the said levers extend horizontally. When in this position the free ends of the lifting levers are connected with the scale mechanism on the side of the wagon for holding the load in suspension and weighing the load. This scale mechanism consists of the graduated scale beam 38 which has the laterally projecting V-shaped or knife edge bearings 39 near the end thereof at which the weight is applied, which said bearings engage the loops or eyes of the U-shaped link or clevis 40. This link or clevis 40 hooks onto the bracket 41 on the side of the wagon bed so as to be easily removed. The long arm of the scale beam is graduated and has the weight 42 slidable thereon and the pendent weights 43 at the end, and said end extends into the loop 44 on the side of the wagon bed to limit the oscillation of the scale beam.

The reverse end of the scale beam, to which the weight of the load is applied, is provided with a block 45 which slides lengthwise of the scale beam on the parallel rods 46 to adjust the leverage which the load exerts on the scale mechanism, and said block may be accurately adjusted by means of the threaded member 47 which is mounted on the scale beam and has a threaded connection with a portion of the block 45. When properly adjusted the said block is locked in place by tightening the bolts 48 which clamp the block immovably on the rods 46. This block has laterally extending inverted V-shaped knife edge bearings which carry the clevis 49, to which is attached the link 50, to which the lifting levers 33 and 34 are attached when the load is to be weighed. The link 50 hooks on the clevis 49 as shown and is provided on its lower end with a transverse piece 51. This transverse piece 51 is knife edged at each side of the rod or link 50 on the upper edge and supports the ends of the lifting levers 33 and 34 thereon, one on each side of the rod 50, and has the upturned portions 52 at the outer ends of the said knife edged portions to keep the levers from slipping off the knife edged portions. The transverse piece 51 has a threaded connection with the link or rod 50 so as to be moved nearer or farther from the scale beam so that it can be adjusted to hold the lifting levers 33 and 34 in a perfectly horizontal position.

As is apparent the wagon bed may vary in weight at times from various causes, for instance when wet, or when it has been repaired, or when side boards have been put on, hence it is necessary to provide means for adjusting the scale mechanism to compensate for the variations in weight of the wagon bed or other frame which carries the load. This means consists of the weighted bar 53 which is carried by the scale beam and is slidable lengthwise thereof through a tubular opening 54 therein. By adjusting this rod lengthwise in said tubular opening 54, the scale beam may be brought to a perfect balance. It is evident that the wagon bed will seldom vary in weight consequently when the rod or bar 53 has been adjusted there is little need to change it. However, this rod is made detachable from the scale beam so that it may be removed from the scale beam when the scale mechanism is taken off the wagon to reduce the length thereof, and for the purpose of enabling the operator to easily and quickly insert the said rod or bar 53 at the proper adjustment, the collar 55 is provided on the rod, which said collar may be adjusted and set on the rod to contact with the end of the tubular opening when in the proper position of adjustment.

The bolsters of the wagon are not always the same distance apart, for instance, when used with a hay-rack the bolsters are considerably farther apart than when used with the ordinary wagon bed. The levers 33 and 34 are made of the length required for use with an ordinary wagon bed, and for adapting the weighing mechanism for any spacing of the bolsters an extension 56 is provided for each of the levers 33 and 34, and the scale block 45 is made adjustable as hereinbefore specified to compensate for the increased length of the levers. These extensions are designed to extend in line with the levers and to be easily and readily attached and detached therefrom, and for this purpose are provided with a pair of suitably distanced, laterally projecting pins 57 with heads on the outer ends thereof, which are adapted to engage similarly distanced slots 58 in the ends of the lifting levers. The width of the slots 58 is the same as the diameter of the stem of the pins, and the ends of the said slots are enlarged as at 59 to permit insertion therethrough of the heads of the pins 57. To attach the extensions to the lifting levers the pins 57 are inserted through the openings 59 and the extensions drawn forward until the stems of the pins lie in the opposite ends of the slots 58 from the enlarged openings 59, in which position the heads of the pins lie against the edge of the slots and hold the extensions against the levers. For adjusting the block 45 on the scale to accommodate the increased length of the levers 33 and 34, the scale mechanism is placed in position, a known weight placed in the wagon bed or other load carrying frame, and the block 45 adjusted and set at such position in which the scale mechanism accurately registers the weight.

As shown in the drawings Figs. 1 and 2, some wagons have the brake beam extending laterally from the wagon a considerable distance below the bottom of the wagon bed, and in such case it will be necessary for the rear lever 34 to be constructed so that it can be moved past the brake beam 60. This is effected by jointing the lever as at 61, so that the part 62 thereof may be swung on the part 63 on the pin 61 to pass the brake beam. Provision is made for locking the parts 62 and 63 together in line, consisting of the slot 64 in the part 63, the notch 65 in the end of the part 62, and the bolt or rivet 66 adapted to slide in the slot 64 for engaging the notch 65. When it is desired to move the lever 34 past the brake beam 60 the bolt or rivet 66 is moved to the end of the slot 64 out of engagement with the notch 65 leaving the part 62 free to move on the pivot 61. After passing the brake beam, the parts are swung into line and the bolt or rivet 66 moved to the opposite end of the slot 64 into engagement with the notch 65 which locks the parts together.

From the foregoing it is apparent that in the inoperative position of the weighing mechanism the only parts that are on the wagon are the bracket 41, the friction rollers 30, and the lifting members 10 and 11 together with their connecting shafts 20. The lifting members and shafts are then dropped down against the side of the bolster upon which they are mounted, the extensions 32 being of such length that they do not interfere with the movement of the bolsters on their supporting part.

To weigh the load, the scale mechanism is hooked on the bracket 41, and the lifting levers 33 and 34 attached to the extensions 32 of the lifting members 10, raised to a horizontal position and the ends thereof supported on the transverse piece 51 of the scale mechanism, when the weight of the load may be ascertained as is any ordinary scale mechanism.

What I claim is:—

1. In a vehicle weigher, the combination with the bolsters and the load carrying frame thereon, of a lifting member terminating in a downwardly projecting bearing adapted to bear on a part of the bolster, a stud adjacent the said bearing extending laterally from the side of the lifting member, and a guard on the bolster embracing said stud to hold the lifting member in place on the bolster.

2. In a vehicle weigher, the combination with the bolsters, the load carrying frame and the standards on the bolsters at each side of the load carrying frame, of lifting devices pivotally mounted on the bolsters and adapted to engage the load carrying frame for raising the load carrying frame from the normal position to the load weighing position, and a removable superstructure on each bolster intermediate of the standards for supporting the load carrying frame in the normal position, said superstructure being provided with means at each end for engaging the standards whereby the superstructure is held in place on the bolster.

3. In a vehicle weigher, the combination with the bolsters, the load carrying frame and the standards on the bolsters at each side of the load carrying frame, of lifting devices pivotally mounted on the bolsters and adapted to engage the load carrying frame for raising the load carrying frame from the normal position to the load weighing position, and a removable superstructure on each bolster intermediate of the standards for supporting the load carrying frame in the normal position, said superstructure being provided with notches at the ends for engaging the standards to hold said superstructure in place on the bolster.

4. In a vehicle weigher, the combination with the bolsters, the load carrying frame and the standards on the bolsters at each side of the load carrying frame, of lifting devices adapted to engage the load-carrying frame for lifting the said load carrying frame from the normal position to the load weighing position, and a wedge member at the inner side of and adjacent the base of each standard for forcing the load carrying frame away from the standards.

5. In a vehicle weigher, the combination with the bolsters, the load carrying frame, and the standards on the bolsters at each side of the load carrying frame, of a superstructure on each bolster intermediate of the standards, a bearing plate at each end of the superstructure on the under face thereof, a cut-away place in the superstructure above each bearing plate, and lifting members extending into said cut-away places and fulcrumed on the said bearing plates for raising the load carrying frame off the superstructure.

6. In a vehicle weigher, the combination with the bolsters, the load carrying frame, and the standards on the bolsters at each side of the load carrying frame, of lifting devices adapted to engage the load carrying frame for lifting said load carrying frame from the normal position to the load weighing position, a superstructure carried on each bolster for supporting the load carrying frame in its normal position, and a wedge member carried by the superstructure at the inner side of and adjacent the base of each standard for holding the load carrying frame away from the standards.

7. In a vehicle weigher, the combination with the bolsters, the load carrying frame and the standards on the bolsters at each side of the load carrying frame, of a removable superstructure on each bolster intermediate of the standards, means for holding the superstructure in place on the bolster, bearing plates at each end of the superstructure on the under face thereof, a cut-away place in the superstructure above each bearing plate, a lifting member extending into each cut-away place and fulcrumed on said bearing plate for raising the load carrying frame off the superstructure, means for holding said lifting members from displacement on the bearing plates, and wedge members carried by the superstructure adjacent the base of each standard for holding the load carrying frame away from the standards.

8. In a vehicle weigher, the combination with the transporting truck and the load carrying frame thereon, of a lifting member fulcrumed on the transporting truck, a lifting lever for operating said lifting member and a pair of diagonally arranged lugs on the lifting member adapted to be engaged by the lifting lever.

9. In a vehicle weigher, the combination with the transporting truck and the load carrying frame thereon, of a lifting member provided with a longitudinal extension, a pair of diagonally arranged lugs on said extension, a lever adapted to be inserted between said lugs for operating the lifting member, lips on the said lugs for holding the lever therein and a stop for limiting the insertion of the lever in place between said lugs.

10. In a vehicle weigher, the combination with the transporting truck and load carrying frame, of a transverse strip on the bottom of the load carrying frame extending from side to side thereof, a truss rod for bracing said strip and lifting members fulcrumed on the transporting truck adapted to bear at the ends of the said transverse strip for raising the load carrying frame.

11. In a vehicle weigher, the combination with the transporting truck and load carrying frame, of a transverse strip on the bottom of the load carrying frame extending from side to side thereof, a brace for said strip extending from end to end thereof, bearing plates at each end of the strip and lifting members fulcrumed on the transporting truck and adapted to bear against said bearing plates at the ends of each strip for raising the load carrying frame.

12. In a vehicle weigher, the combination with the transporting truck and load carrying frame, of a transverse strip on the bottom of the load carrying frame extending from side to side thereof, a truss rod bowed under said strip and connected at each end thereof for strengthening said strip and bearing plates at each end of the strip and lifting members fulcrumed on the transporting truck and adapted to engage the bearing plates at the ends of the transverse strip for raising the load carrying frame.

13. In a vehicle weigher, the combination with the transporting truck and load carrying frame, of a transverse strip on the bottom of the load carrying frame extending from side to side thereof, a bearing plate on each end of said transverse strip provided with an upwardly extended portion secured to the sides of the load carrying frame, a truss rod bowed beneath the transverse strip and extending from end to end thereof and provided with threaded ends which pass through the upwardly extending portions of the bearing plates, a nut on each threaded end of the said truss rod adapted to bear against the upwardly extending portions of the aforesaid bearing plates to draw said truss rods taut and lifting members fulcrumed on the transporting truck and adapted to engage the bearing plates at the ends of the transverse strip for raising the load carrying frame.

14. In a vehicle weigher, the combination with the transporting truck, the load carrying frame and a brake beam on the transporting truck projecting laterally beyond the side of the load carrying frame, of a lifting member fulcrumed on the transporting truck for raising the load carrying frame and a lever detachably connected with said lifting member and operable in a vertical plane at the side of the load carrying frame, said lever comprising sections pivotally connected intermediate of the said brake beam and the fulcrum of the lever, and means for locking said sections in a predetermined relative position.

15. In a vehicle weigher, the combination with the transporting truck, the load carrying frame thereon and lifting members for raising the load carrying frame, of lifting levers for operating said lifting members, extensions for said lifting levers, a plurality of projections on each of the said extensions and a plurality of openings in each of the lifting levers adapted for interengagement with the said projections for securing the extension of the lifting levers.

16. In a vehicle weigher, the combination with the transporting truck, the load carrying frame and lifting members for raising the load carrying frame, of lifting levers for operating said lifting members, extensions for said lifting levers, laterally projecting headed pins on each of the extensions and slots in each of the lifting levers, the said slots being adapted to fit the stems of the pins and being provided at the corresponding ends with an enlarged opening to admit passage therethrough of the heads of the pins.

17. In a vehicle weigher, the combination with the transporting truck, and load carrying frame, of scale mechanism, lifting members provided with operating levers for lifting the load carrying frame, said levers having their free ends adapted to be adjacent when moved to a position to hold the load carrying frame in the load weighing position, said scale mechanism, an inverted T-shaped hanger suspended from said scale mechanism for supporting the adjacent free ends of the levers.

18. In a vehicle weigher, the combination with the transporting truck, the load carrying frame, lifting members for raising the load carrying frame from the normal position to the load weighing position, levers for operating the lifting members, and weight indicating mechanism, of a link suspended from the weight indicating mechanism, a part having a threaded connection with said link and having an arm on the opposite side of the link adapted to support the free ends of the aforesaid levers when said levers and the lifting members operated thereby are holding the load carrying frame in the load weighing position.

19. In a vehicle weigher, the combination with the transporting truck, the load carrying frame, the scale mechanism and lifting members provided with lifting levers levers for raising and holding the load carrying frame in suspension, of a link suspended from the scale mechanism and a member having a threaded connection with the link and provided with knife edge bearings at each side of the link adapted to support the free ends of the levers when holding the load carrying frame in suspension.

20. In a vehicle weigher, the combination with the transporting truck, the load carrying frame, the scale mechanism and lifting members provided with lifting levers levers for raising and holding the load carrying frame in suspension, of a link suspended from the scale mechanism and a member having a threaded connection with the link and provided with knife edge bearings at each side of the link adapted to support the free ends of the levers when holding the load carrying frame in suspension, and upwardly extended portions at the outer ends of the said knife edge bearings for holding the ends of the lifting members thereon.

21. In a vehicle weigher, the combination with the transporting truck, the load carrying frame and lifting mechanism on the transporting truck for raising the load carrying frame, a scale beam adapted to be connected with the lifting mechanism to indicate the weight of the load, and provided with a tubular opening extending longitudinally of the scale beam, a rod adapted to slide in said tubular opening for balancing the scale beam and the adjustable collar on said rod for the purposes specified.

22. In a vehicle weigher, the combination with the transporting truck provided with bolsters, a load carrying frame thereon, of lifting mechanism mounted on the bolsters of the transporting truck for raising the load carrying frame, scale mechanism provided with a sliding part adapted to be connected with the lifting mechanism and a threaded member on said scale mechanism for adjusting the sliding part thereon.

23. In a vehicle weigher, the combination with the transporting truck provided with bolsters and load carrying frame thereon, of lifting mechanism mounted on the bolsters of the transporting truck, a scale beam provided with a block on the weight end of the scale beam slidable longitudinally thereof and adapted to be connected with the aforesaid lifting mechanism on the bolsters, a threaded member carried by the scale beam and engaging the slidable block for adjusting the same and means for locking the block in the adjusted position on the scale beam.

In testimony whereof I have affixed my signature, in presence of two witnesses.

JAMES R. HARRISON.

Witnesses:
MARY E. COMEGYS,
E. M. GILES.